(12) United States Patent
Osai et al.

(10) Patent No.: US 11,243,303 B2
(45) Date of Patent: Feb. 8, 2022

(54) PORTABLE TERMINAL POSITION DETECTION APPARATUS

(71) Applicant: DENSO CORPORATION, Kariya (JP)

(72) Inventors: Hidenori Osai, Nisshin (JP); Kenichiro Sanji, Nisshin (JP); Takatoshi Sekizawa, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/920,954

(22) Filed: Jul. 6, 2020

(65) Prior Publication Data
US 2020/0333448 A1    Oct. 22, 2020

Related U.S. Application Data

(63) Continuation of application No. PCT/JP2019/000105, filed on Jan. 7, 2019.

(30) Foreign Application Priority Data

Jan. 9, 2018    (JP) .............................. JP2018-001445

(51) Int. Cl.
*G01S 11/06* (2006.01)
*B60R 25/24* (2013.01)
*E05B 81/56* (2014.01)

(52) U.S. Cl.
CPC .............. *G01S 11/06* (2013.01); *B60R 25/24* (2013.01); *E05B 81/56* (2013.01)

(58) Field of Classification Search
CPC ........... B60R 25/24; G01S 11/06; E05B 81/56
See application file for complete search history.

(56) References Cited

U.S. PATENT DOCUMENTS

| | | | |
|---|---|---|---|
| 2008/0150711 A1* | 6/2008 | Mori .................. | B60C 23/0444 340/445 |
| 2015/0314752 A1* | 11/2015 | Shigetomi ............... | B60R 25/34 340/426.18 |
| 2019/0184774 A1* | 6/2019 | Okada .................. | B60C 23/003 |

FOREIGN PATENT DOCUMENTS

| | | |
|---|---|---|
| JP | 2009084929 A | 4/2009 |
| JP | 2009155864 A | 7/2009 |

* cited by examiner

*Primary Examiner* — Dao L Phan
(74) *Attorney, Agent, or Firm* — Harness, Dickey & Pierce, P.L.C.

(57) ABSTRACT

In a vehicle, a vehicle body-side apparatus is configured to perform a main area determination and an auxiliary area determination. The main area determination determines whether a portable terminal is present in a main area based on a first reception intensity measured by the vehicle body-side apparatus in a wireless signal from the portable terminal. The auxiliary area determination determines whether the portable terminal is present in an auxiliary area based on a second reception intensity measured by a vehicle tire-side apparatus in a wireless signal from the portable terminal.

8 Claims, 5 Drawing Sheets

PORTABLE TERMINAL POSITION DETECTION APPARATUS

CROSS REFERENCE TO RELATED APPLICATIONS

The present application is a continuation application of International Patent Application No. PCT/JP2019/000105 filed on Jan. 7, 2019, which designated the U.S. and claims the benefit of priority from Japanese Patent Application No. 2018-001445 filed on Jan. 9, 2018. The entire disclosures of all of the above applications are incorporated herein by reference.

TECHNICAL FIELD

The present disclosure relates to a portable terminal position detection apparatus that detects the position of a portable terminal held by a user for the vehicle. The portable terminal position detection apparatus is suitably applied to a smart key system (registered trademark).

BACKGROUND

A door opening/closing system for a vehicle includes a smart key system that enables a vehicle door to be opened/closed using a portable terminal serving as an electronic key called a smart key (registered trademark) without using a mechanical key. The smart key system performs an area determination to detect the position of the smart key. When the user holding the smart key approaches the vehicle and the smart key becomes present in the predetermined area, an inside-of-area determination is concluded and the door is thereby unlocked. If the smart key is not present in the predetermined area, an outside-of-area determination is concluded and the door is thus not unlocked.

SUMMARY

According to an example of the present disclosure, in a vehicle, a vehicle body-side apparatus may be configured to perform a main area determination and an auxiliary area determination. The main area determination may determine whether a portable terminal is present in a main area based on a first reception intensity measured by the vehicle body-side apparatus in a wireless signal from the portable terminal. The auxiliary area determination may determine whether the portable terminal is present in an auxiliary area based on a second reception intensity measured by a vehicle tire-side apparatus in a wireless signal from the portable terminal.

BRIEF DESCRIPTION OF DRAWINGS

The objects, features and advantages of the present disclosure will become more apparent from the following detailed description made with reference to the accompanying drawings. In the drawings.

DETAILED DESCRIPTION

Hereinafter, embodiments of the present disclosure will be described with reference to the drawings. In the following embodiments, the same or equivalent parts are denoted by the same reference signs.

First Embodiment

A vehicle system including a smart key system according to a first embodiment will be described. The vehicle system according to the present embodiment uses a tire-side apparatus in a tire state detection system also as a part of a smart key system. The part of the smart key system included in this vehicle system that realizes the function of detecting the position of a portable terminal is a portion that is included in the portable terminal position detection apparatus for the vehicle. Note that the smart key system of the vehicle system performs an area determination as to whether a portable terminal held by the user is within a predetermined area for the vehicle, and concludes the area determines that the portable terminal is within the area if the portable terminal is within the predetermined area. The door opening/closing operation can thereby be performed. The detailed configuration of the vehicle system 100 including the smart key system will be described with reference to FIGS. 1 and 2.

Figure 1:
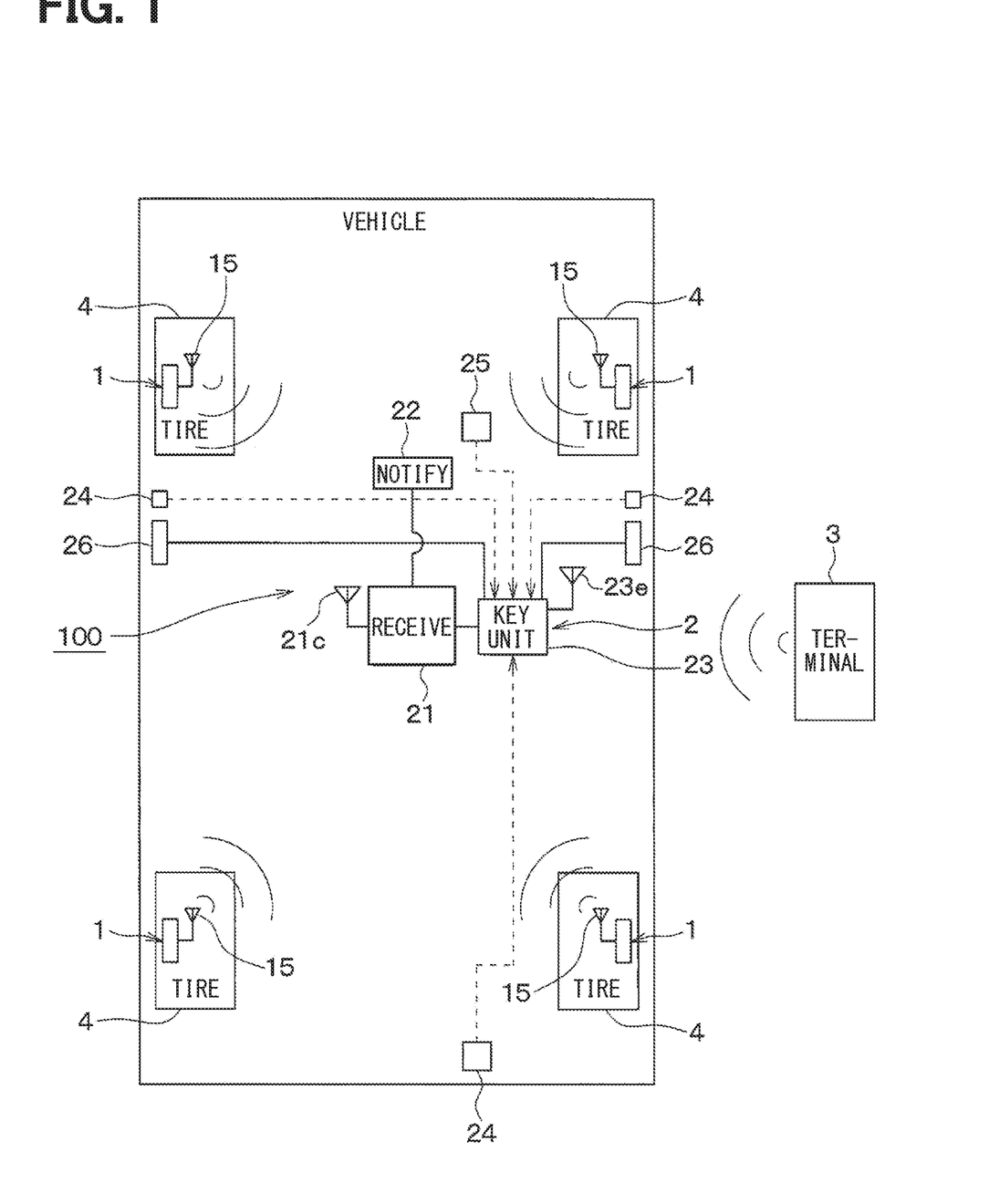
FIG. 1 is a diagram showing a schematic configuration of a smart key system according to a first embodiment.

As shown in FIG. 1, a vehicle system 100 is configured to include (i) a tire-side apparatus 1, which may also be referred to as a vehicle tire-side apparatus 1), provided on a tire side, (ii) a vehicle body-side system 2 provided on a vehicle body, and (iii) a portable terminal 3 carried or held by a user. Atypical smart key system performs an area determination without including the tire-side apparatus 1 as a component. In the present embodiment, the area determination is performed by including the tire-side apparatus 1 as a component instead.

The tire-side apparatus 1 is provided for any one of a plurality of wheels provided in the vehicle, and is used for detecting a state relating to the corresponding tire 4. For example, the tire-side apparatus 1 is configured with a wireless transmitter for detecting tire air pressure or detecting road surface condition. The tire-side apparatus 1 is attached to the air valve of the wheel or to the back of the tread of the tire 4. In the present embodiment, the tire-side apparatus 1 also assists the area determination in the smart key system. The following will describe a case where the tire-side apparatus 1 serves as a wireless transmitter for detecting a tire air pressure as an example. However, the present disclosure can also be applied to a case where a wireless transmitter for detecting a road surface condition is used.

Figure 2:
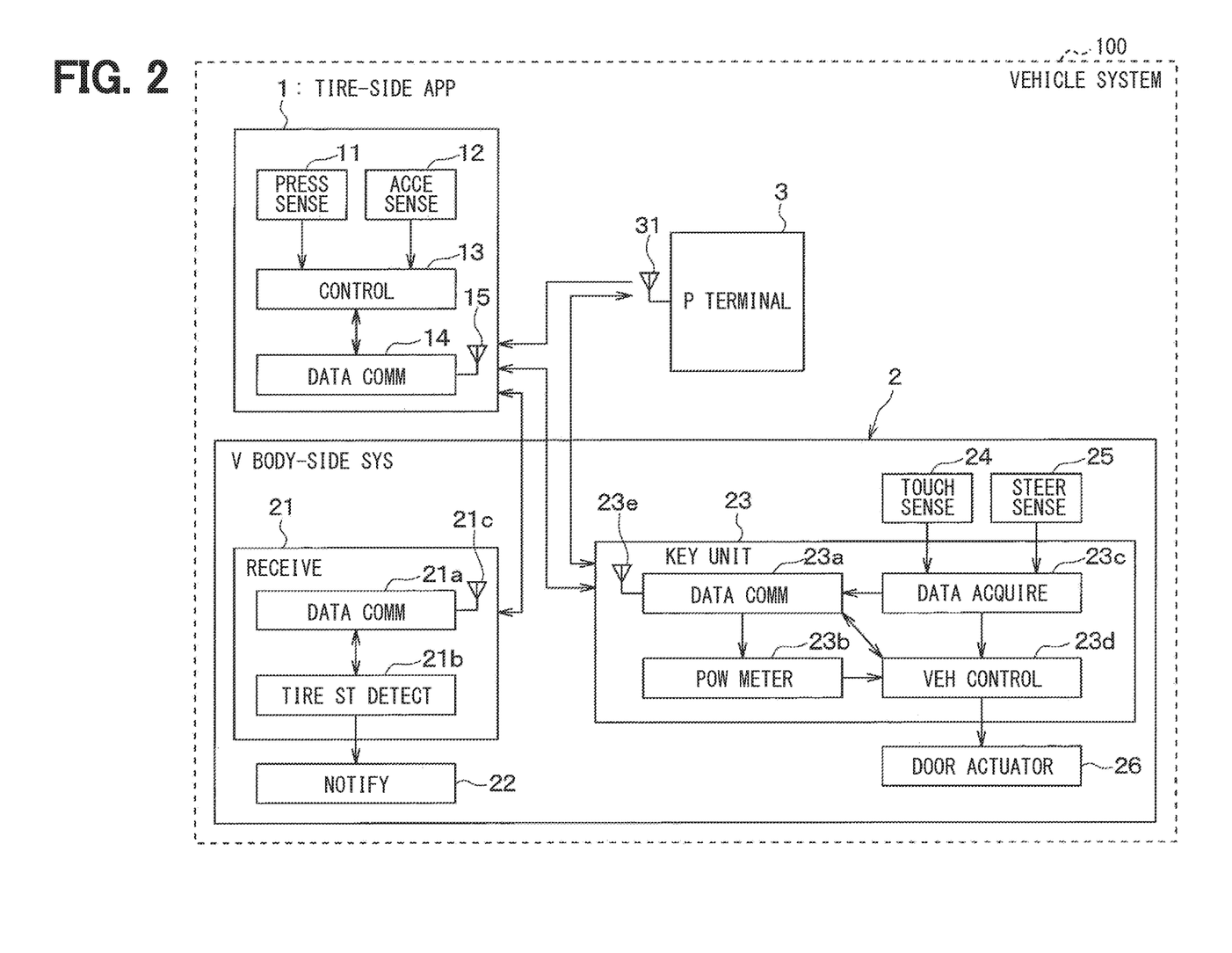
FIG. 2 is a block diagram showing details of a tire-side apparatus, a vehicle body-side system, and a portable terminal, which are included in the smart key system.

The tire-side apparatus 1 includes (i) a sensor system including a pressure sensor 11 and an acceleration sensor 12, (ii) a control unit 13 (which may also be referred to as a controller 13 in the tire-side apparatus 1), and (iii) a data communication unit 14 (which may also be referred to as a transceiver 14 in the tire-side apparatus 1).

The pressure sensor 11 is, for example, a diaphragm type, and outputs a detection signal corresponding to the tire air pressure to the control unit 13. Although not shown here, by providing a temperature sensor to detect the temperature in the tire, the measured value of the tire air pressure detected by the pressure sensor 11 can be converted into the tire air pressure at the reference temperature.

The acceleration sensor 12 outputs a detection signal corresponding to the acceleration generated with the rotation of the tire, for example, the radial acceleration of each tire 4. The acceleration sensor 12 outputs a detection signal according to the magnitude of the centrifugal acceleration applied to the tire 4 when the tire 4 rotates, in addition to the gravitational acceleration. For example, the acceleration sensor 12 generates, as a detection signal, an output voltage or the like in which one of the two directions of the tire 4 in the radial direction, inward and outward, is positive and the opposite direction is negative.

The control unit 13 serves as a signal processing unit. In the control unit 13, a tire air pressure is calculated by signal processing of a detection signal of the pressure sensor 11; the detection signal of the acceleration sensor 12 is processed to determine whether the vehicle is running or stopped. Then, when determining that the vehicle is running, for example, the control unit 13 transmits the tire air pressure to the vehicle body-side system 2 by transmitting data on the tire air pressure to the vehicle body-side system 2. Further, the control unit 13 detects the angle of the tire-side apparatus 1 in the tire 4 based on the gravitational acceleration component included in the detection signal of the acceleration sensor 12. Then, the control unit 13 transmits data indicating the angle of the tire-side apparatus 1 to the vehicle body-side system 2 together with the data on the tire air pressure or separately, as necessary.

Here, the angle of the tire-side apparatus 1 in the tire 4 means the angle at which the tire-side apparatus 1 is positioned with respect to the center of the tire 4. For example, when the tire-side apparatus 1 is located at the uppermost position of the tire 4, the angle is set to 0 degree. When the tire 4 is rotated forward and the tire-side apparatus 1 is located at the most front side of the vehicle, the angle is set to 90 degrees. When the tire-side apparatus 1 is located at the lowermost position of the tire 4, the angle is set to 180 degrees. When the tire-side apparatus 1 is located at the rearmost position of the vehicle, the angle is set to 270 degrees.

The control unit 13 has a function of determining whether the portable terminal 3 is present in the determination area of the tire-side apparatus 1 based on a request from the vehicle-side system 2 in addition to the tire air pressure detection function. The control unit 13 further assists the area determination by transmitting the determination index to the vehicle body-side system 2. Hereinafter, the determination area of the tire-side apparatus 1 is referred to as an auxiliary area. The determination of whether the portable terminal 3 is present in the auxiliary area is referred to as auxiliary area determination. The auxiliary area determination is performed by the tire-side apparatus 1 and the vehicle body-side system 2. In the auxiliary area determination, the inside-of-auxiliary area determination is concluded when the portable terminal 3 is present in the auxiliary area; the outside-of-auxiliary area determination is concluded when the portable terminal 3 is not present in the auxiliary area.

For example, the control unit 13 has a function of receiving a wireless signal from the portable terminal 3 and obtaining the reception intensity, and performs an auxiliary area determination of the tire-side apparatus 1 based on the obtained reception intensity. Specifically, upon receiving a start trigger from the vehicle body-side system 2, the control unit 13 performs an auxiliary area determination. If the reception strength or the RSSI (Received Signal Strength Indication) value corresponding to the reception strength exceeds a predetermined threshold value, the inside-of-auxiliary area determination is concluded. In contrast, if not, the outside-of-auxiliary area determination is concluded. Then, such a determination result is transmitted to the data communication unit 14 to be transmitted to the vehicle body-side system 2. The final auxiliary area determination based on the determination result of the tire-side apparatus 1 is performed in the vehicle body-side system 2.

Further, another configuration may be provided. That is, the control unit 13 in the tire-side apparatus 1 may have a function of only transmitting a determination index for the auxiliary area determination to the vehicle body-side system 2, whereas only the vehicle body-side system 2 may perform the auxiliary area determination. In this case, the data communication unit 14 in the tire-side apparatus 1 may transmit, as a determination index of the auxiliary area determination to be performed by the vehicle body-side system 2, data indicating either the reception intensity in the wireless signal from the portable terminal 3 or an RSSI value corresponding to the reception intensity. Then, in the vehicle body-side system 2, the final auxiliary area determination is performed based on the determination index.

Note that unique identification information (hereinafter, referred to as ID information) is assigned to each of the tire-side apparatuses 1; data transmitted from each tire-side apparatus 1 is provided with corresponding ID information. For this reason, the vehicle body-side system 2 can confirm the tire-side apparatus 1 has transmitted the data among the plurality of tire-side apparatuses 1, or the wheel corresponding to the confirmed tire-side apparatus 1. In addition, here, the case where the tire-side apparatus 1 is a wireless transmitter for tire air pressure is taken as an example, so that data related to tire air pressure is transmitted. If the case where the tire-side apparatus 1 is a wireless transmitter for detecting the road surface condition, the road surface data indicating the road surface condition is transmitted. The road surface data may be acquired, for example, by providing a vibration sensor unit for detecting vibration of the tire 4 and by performing the signal processing to the detection signal by the vibration sensor unit.

The data communication unit 14 is capable of two-way communication through an antenna 15. The data communication unit 14 plays a role of transmitting data to the vehicle body-side system 2 and receiving data from the vehicle body-side system 2 and the portable terminal 3. For example, the data communication unit 14 plays a role of transmitting specified data from the control unit 13 to the vehicle body-side system 2. Such specified data include, in the present embodiment, data relating to the tire air pressure, and either the result of the auxiliary area determination or the data of the determination index, which will be used in the area determination in the vehicle body-side system 2. In addition, the data communication unit 14 may receive a start trigger from the vehicle body-side system 2 as a request to execute the auxiliary area determination, as described later. Therefore, the data communication unit 14 also plays the role of receiving the activation trigger and transmitting it to the control unit 13. Further, when the control unit 13 determines the auxiliary area in the tire-side apparatus 1, the data communication unit 14 receives a wireless signal from the portable terminal 3 and transmits the wireless signal to the control unit 13.

Here, the data communication unit 14 is described as one unit, but may be configured separately for the transmission unit and the reception unit (i.e., transmitter and receiver). In addition, various types of bidirectional communication can be applied; the various types include Bluetooth communication including BLE (abbreviation of Bluetooth Low Energy) communication, wireless LAN (abbreviation of Local Area Network) such as wifi, Sub-GHz communication, ultra wideband communication, and ZigBee. Note that Bluetooth is a "registered trademark".

The vehicle body-side system 2, which is provided on the vehicle body side of the vehicle, includes a tire state receiver 21, a notification device 22, an in-vehicle smart key unit 23, a touch sensor 24, a steering angle sensor 25, and a door actuator 26.

The tire state receiver 21 detects a state related to the tire based on data transmitted from the tire-side apparatus 1. In the present embodiment, the tire state receiver 21 detects the tire air pressure as a state related to the tire 4. Specifically, the tire state receiver 21 has a configuration including a data communication unit 21a (which also be referred to as a transceiver 21a in the tire state receiver 21) and a tire state detection unit 21b (which also be referred to as a controller 21b in the tire state receiver 21).

The data communication unit 21a serves as a second data communication unit, and performs communication with the data communication unit 14 in the tire-side apparatus 1 through the antenna 21c. Specifically, the data communication unit 21a plays a role of receiving the data transmitted from the data communication unit 14 and transmitting the data to the tire state detection unit 21b.

The tire state detection unit 21b corresponds to an electronic control unit (hereinafter, referred to as an ECU) or a controller for detecting a state related to the tire 4. When the tire air pressure is measured, the tire state detection unit 21b is configured by an ECU or controller of the tire air pressure detection system (hereinafter, referred to as TPMS). The tire state detection unit 21b (i.e., an ECU or controller) is configured by a microcomputer (i.e., computer). In the present embodiment, as an example, such a computer includes a central processing unit (CPU), a ROM, a RAM, and an I/O, to perform various processes according to a program stored in the ROM to detect a tire air pressure based on the received data. Then, the tire state detection unit 21b detects a decrease in the tire air pressure by comparing the detected tire air pressure with a predetermined threshold value Th, and outputs a signal to that effect to the notification device 22 when the decrease in the tire air pressure is detected.

When the tire-side apparatus 1 is a wireless transmitter for detecting a road surface condition, the tire state detection unit 21b determines the road surface condition as a state related to the tire 4. Then, the determination result of the road surface condition is output to an ECU for performing the vehicle motion control, or is output to the notification device 22.

The notification device 22 notifies a driver of a detection result of a state related to a tire, and performs a visual or audible notification. For example, when it is assumed that the notification device 22 performs a visual notification, the notification device 22 is disposed at a place where the driver can visually recognize the notification device 22 and includes an indicator such as an alarm indicator lamp or a display installed in an instrument panel of the vehicle. When the detection result of the tire air pressure is transmitted from the tire-side apparatus 1 as in the present embodiment, for example, when it is detected that the tire air pressure has decreased, the notification device 22 displays a message to that effect. In addition, when it is assumed that the notification device 22 performs audible notification, the notification device 22 includes a speaker.

The in-vehicle smart key unit 23 (a key unit in the drawings) may be also referred to as a reception apparatus 23 or a vehicle body-side apparatus 23 that communicates with the portable terminal 3, and performs an area determination and a door opening/closing operation. In the present embodiment, the in-vehicle smart key unit 23 also communicates with the tire-side apparatus 1 to determine the area. Specifically, the in-vehicle smart key unit 23 is configured to include a data communication unit 23a and a controller, which includes a power meter unit 23b, a data acquisition unit 23c, and a vehicle control unit 23d. Among these, the power meter unit 23b, the data acquisition unit 23c, and the vehicle control unit 23d are units configured by a smart ECU or a controller.

The data communication unit 23a performs communication with the portable terminal 3 and communication with each tire-side apparatus 1 through an antenna 23e; thereby the bidirectional communication can be performed between them. Specifically, the data communication unit 23a communicates with the portable terminal 3 and each tire-side apparatus 1 through the antenna 23e provided in a pillar portion of the vehicle, for example, as shown in FIG. 1.

The data communication unit 23a receives the wireless signal transmitted from the portable terminal 3; thereby, the power meter unit 23b measures the reception intensity in the received wireless signal. The measured reception intensity or the RSSI value corresponding to the reception intensity is transmitted to the vehicle control unit 23d.

The data acquisition unit 23c receives detection signals from the touch sensor 24 and the steering angle sensor 25, and detects that the user has touched the door handle and detects the steering angle of the front wheels that are the steered wheels. Further, the data acquisition unit 23c transmits the detection result to the vehicle control unit 23d.

The vehicle control unit 23d performs an area determination to determine whether the portable terminal 3 is present in a determination area defined in a predetermined range from the vehicle, and performs a door opening/closing operation based on the result of the area determination.

The vehicle control unit 23d performs the area determination based on (i) the reception intensity transmitted from the power meter unit 23b or the RSSI value corresponding to the reception intensity, and (ii) the result of the auxiliary area determination, or either the reception intensity or the RSSI value corresponding to the reception intensity, which is transmitted from the tire-side apparatus 1.

Specifically, the vehicle control unit 23d performs an area determination as to whether the portable terminal 3 is present in the determination area of the in-vehicle smart key unit 23 based on whether the reception intensity or the RSSI value corresponding to the reception intensity from the power meter unit 23b exceeds a predetermined threshold value. Hereinafter, the determination area of the in-vehicle smart key unit 23 is referred to as a main area. In addition, a main area determination is defined as determining whether the portable terminal 3 is present in the main area. In the main area determination, the inside-of-main area is concluded when the portable terminal 3 is present in the main area; the outside-of-main area is concluded when the portable terminal 3 is not present in the main area.

Further, the vehicle control unit 23d performs a final auxiliary area determination by determining whether the portable terminal 3 is present in the auxiliary area based on the result of the auxiliary area determination by the tire-side apparatus 1 or the determination index transmitted from the tire-side apparatus 1.

Then, the vehicle control unit 23d confirms that the portable terminal 3 is present in the main area or the auxiliary area by the main area determination or the auxiliary area determination. Responsive to that, the inside-of-area determination is concluded; thereby the door unlocking operation is performed or the door unlocking operation is enabled. In the present embodiment, when it is confirmed that the portable terminal 3 is present in the main area or the auxiliary area while the user is touching the door handle, the vehicle control unit 23d is set to perform the door unlocking operation. In addition, the vehicle control unit 23d automatically performs the door locking when the portable terminal 3 becomes not present in the main area or the auxiliary area outside the vehicle compartment and concludes the out-of-area determination, or when the user releases the hand from the door handle.

Actually, the vehicle control unit 23d determines either the portable terminal 3 of the host vehicle or a portable terminal of another vehicle. Therefore, when confirming that the portable terminal 3 or the like is present in the main area or the auxiliary area, the ID information included in the wireless signal transmitted from the portable terminal 3 or the like is verified. If the ID matches the ID information stored in the vehicle control unit 23d, the vehicle control unit 23d authenticates the portable terminal 3 as a valid one. It is thus determined that a valid portable terminal 3 is present in the main area or the auxiliary area; the door is thereby unlocked.

The touch sensor 24 is provided in, for example, a door handle. When the user touches the door handle, a detection signal indicating the touch is transmitted to the data acquisition unit 23c, and further transmitted to the vehicle control unit 23d. When the inside-of-area determination is concluded in a state where the touch sensor 24 has confirmed that the user has touched the door handle, the vehicle control unit 23d performs the door unlocking operation.

Here, the door is unlocked if the inside-of-area determination is concluded while the user touching the door handle is detected with the touch sensor 24. However, unlocking the door does not require essentially the inside-of-area determination concluded when the door handle is touched. For example, the door may be unlocked only when the inside-of-area determination is concluded. Further, when the inside-of-area determination is concluded, the operation of opening and closing the door may be enabled. Thereafter, when the user touches the door handle or touches a door open/close switch (not shown), the door may be unlocked.

The steering angle sensor 25 outputs a detection signal corresponding to the steering angle of the front wheel serving as a steered wheel, and transmits the detection signal to the data acquisition unit 23c. Based on this, the steering angle is detected by the data acquisition unit 23c.

The door actuator 26 is configured by, for example, a door lock motor. When the vehicle control unit 23d unlocks the door, it transmits an unlock instruction signal to the door actuator 26. When the door actuator 26 is thereby driven, the door is unlocked.

The portable terminal 3 is configured by an electronic key such as a smart key to have a function of transmitting a wireless signal through the antenna 31. The portable terminal 3 communicates with the in-vehicle smart key unit 23 so that the driver's seat door, the passenger's seat door and the trunk room door of the vehicle can be opened and closed. The portable terminal 3 periodically transmits a wireless signal at predetermined intervals, for example. The portable terminal 3 transmits a wireless signal based on a request from the in-vehicle smart key unit 23. Note that the portable terminal 3 only needs to be able to function as a vehicle key by performing a wireless signal transmission function. Therefore, for example, a mobile phone such as a smart phone may be used as a portable terminal 3.

As described above, the vehicle system 100 including the smart key system is provided. Next, the operation of the vehicle system 100 thus configured will be described. Note that, since the detection of the state related to the tire by the tire-side apparatus 1 is well known and is not a characteristic part of the present disclosure, the description is omitted here. A description will be given of an area determination relating to the smart key system.

Figure 3A:
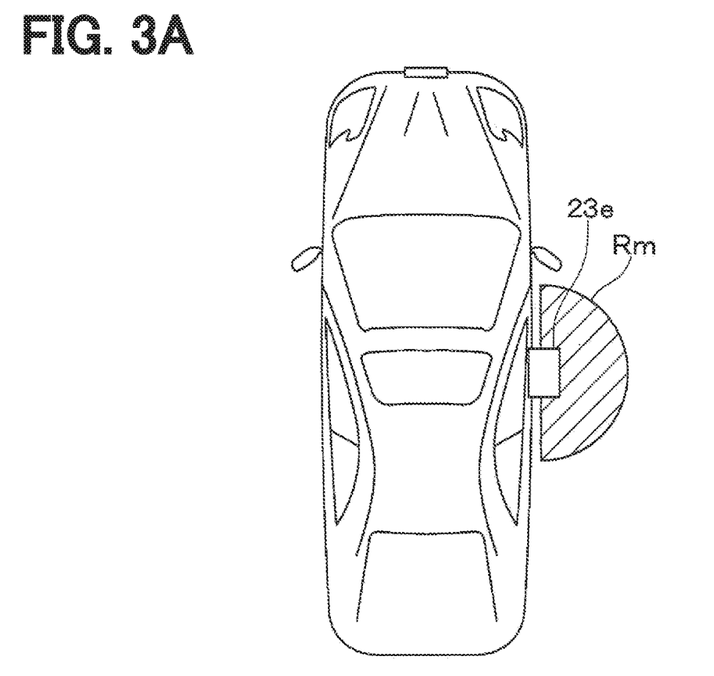
FIG. 3A is a diagram showing a main area centered on an antenna on a driver's seat side.
Figure 3B:
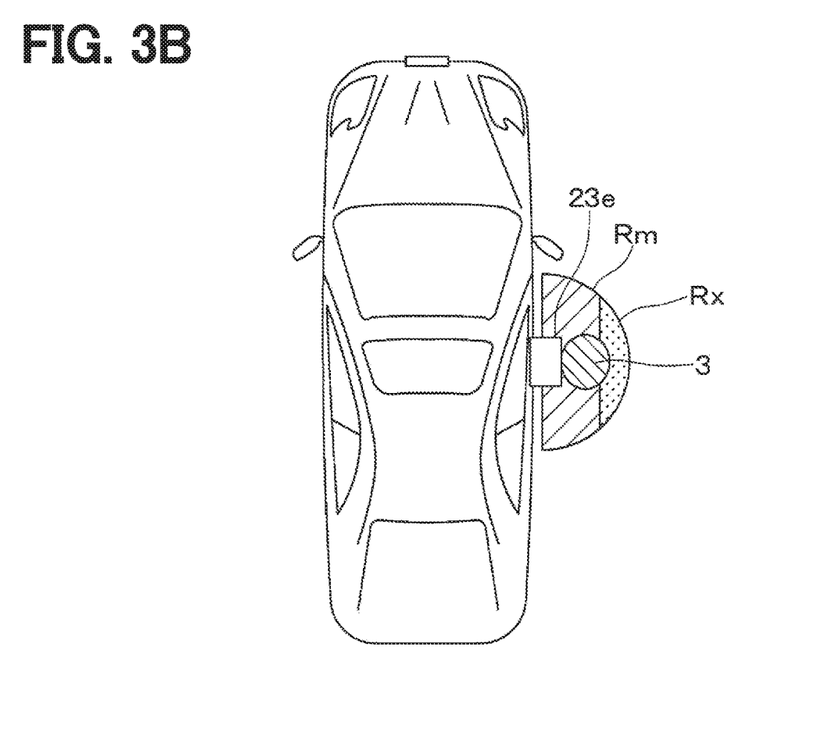
FIG. 3B is a diagram showing a main area and an erroneous determination area centered on an antenna on a driver's seat side.
Figure 3C:
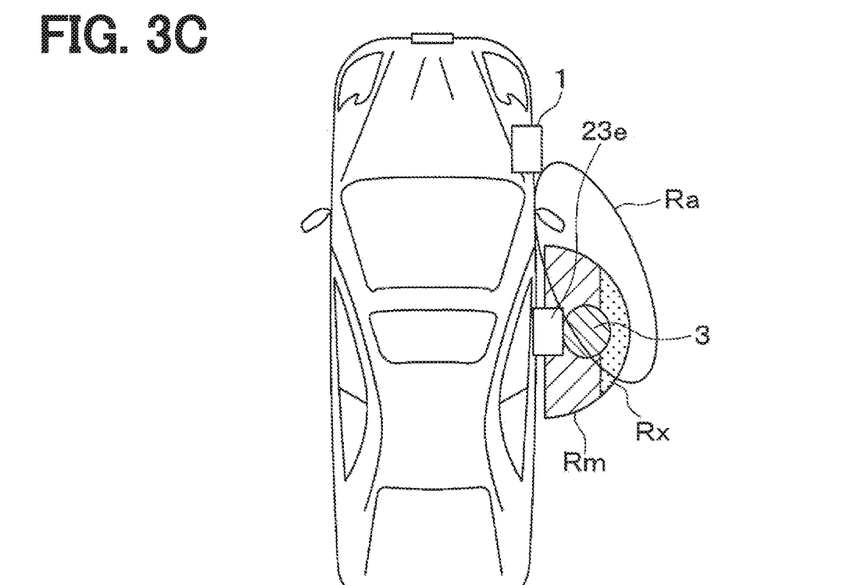
FIG. 3C is a diagram showing a main area and an erroneous determination area centered on an antenna on a driver's seat side, and an auxiliary area formed by the tire-side apparatus.

As shown in FIG. 3A, a main area Rm for the driver's seat door is set around an antenna 23e attached to a pillar on the driver's seat side. Ideally, the main area Rm is a predetermined range around the antenna 23e. However, when the user approaches the driver's seat door while carrying the portable terminal 3, an erroneous determination area Rx may appear, as shown in FIG. 3B. That is, due to loss by the human body or the like, such an erroneous determination area Rx in which the portable terminal 3 cannot be recognized as being present may appear in a range originally included in the main area Rm. For this reason, as shown in FIG. 3C, an auxiliary area Ra is set around the tire-side apparatus 1. The tire-side apparatus 1 can thus recognize that the portable terminal 3 is present in the auxiliary area Ra.

Figure 4:
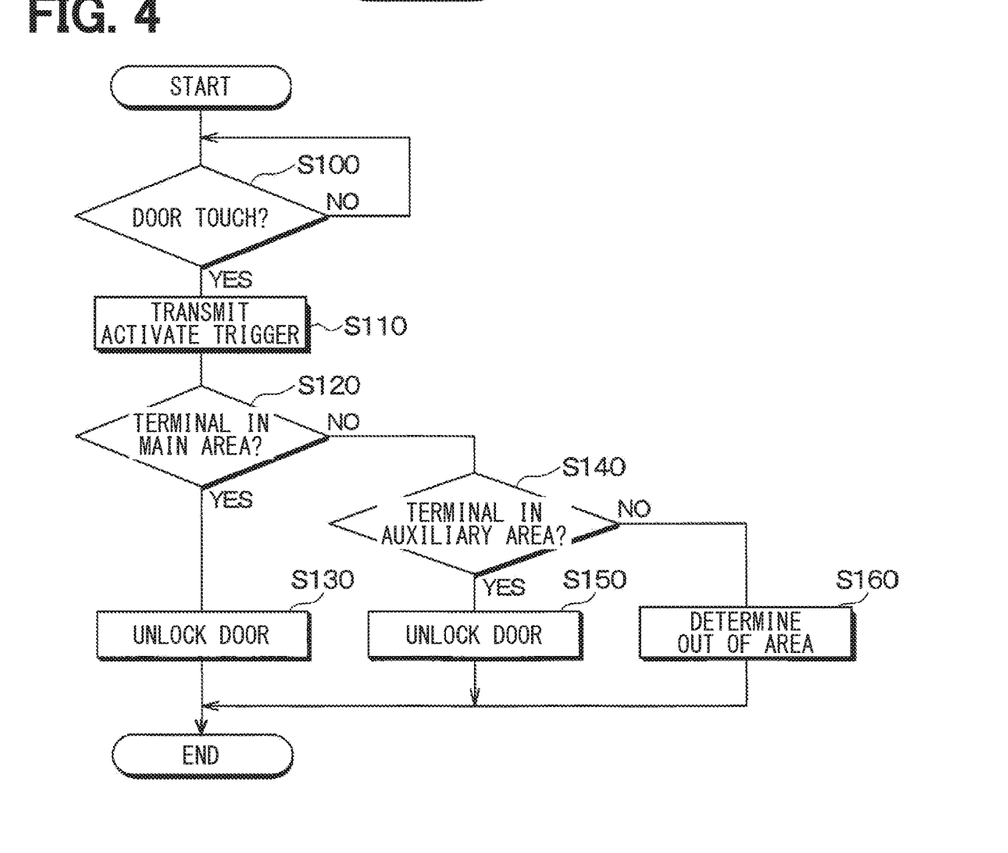
FIG. 4 is a flowchart showing details of an area determination process.

Specifically, in the vehicle body-side system 2, the vehicle control unit 23d of the in-vehicle smart key unit 23 performs an area determination process shown in FIG. 4 every predetermined control cycle, thereby performing the area determination.

First, in step S100, the vehicle control unit 23d performs a door touch determination. The door touch determination is for determining that the user has touched the door handle, and is performed based on a detection signal from the touch sensor 24. When it is determined that the user has touched the door handle, the process proceeds to step S110. In step S110, the vehicle control unit 23d transmits an activation trigger to the surrounding wireless devices, that is, the portable terminal 3 or the tire-side apparatus 1 through the data communication unit 23a. As a result, the portable terminal 3 transmits a wireless signal including its own ID information; the tire-side apparatus 1 enters a state of waiting for reception of the wireless signal transmitted by the portable terminal 3.

In this case, it is preferable that the activation trigger be transmitted to, among a plurality of tire-side apparatuses, the tire-side apparatus 1 for which an auxiliary area is to be formed, for example, the front-wheel tire-side apparatus 1 corresponding to the driver's seat door. For this reason, it is preferable to store the ID information of the tire-side apparatus 1 targeted for the activation trigger, or to adjust the radio field intensity of the activation trigger to define the transmission range.

Thereafter, the process proceeds to step S120, where the vehicle control unit 23d performs, as a first determination, a main area determination that determines whether the portable terminal 3 is present in the main area. That is, when a wireless signal is received from the portable terminal 3 or the like, the power meter unit 23*b* measures the reception intensity or the RSSI value corresponding to the reception intensity. Therefore, the vehicle control unit 23*d* determines whether it exceeds a predetermined threshold value.

In this case, the vehicle control unit 23*d* also determines whether the portable terminal 3 is a valid portable terminal 3 based on ID information included in the wireless signal transmitted from the portable terminal 3 or the like. Then, when the main area determination concludes the inside-of-main area determination and the wireless signal is transmitted from the valid portable terminal 3, the process proceeds to step S130. In step S130, the vehicle control unit 23*d* unlocks the door and ends the process.

In contrast, when a negative determination is concluded in step S120, such that the outside-of-main area is concluded, the process proceeds to step S140. In step S140, a second determination will be performed which corresponds to an auxiliary area determination that determining whether the portable terminal 3 is present in the auxiliary area. That is, the tire-side apparatus 1 measures the reception intensity or the RSSI value corresponding to the reception intensity when receiving a wireless signal from the portable terminal 3, and performs the auxiliary area determination based on the reception intensity or the RSSI value. Further, from the tire-side apparatus 1, the in-vehicle smart key unit 23 receives as a determination index the reception intensity or the RSSI value corresponding to the reception intensity, or the result of the auxiliary area determination performed by the tire-side apparatus 1. For this reason, the vehicle control unit 23*d* performs the auxiliary area determination by determining whether the portable terminal 3 is present in the auxiliary area based on the result of the auxiliary area determination or the reception intensity or the RSSI value corresponding to the reception intensity transmitted as the determination index from the tire-side apparatus 1.

In this case, the vehicle control unit 23*d* also determines whether the portable terminal 3 is a valid portable terminal 3 based on ID information included in a wireless signal transmitted from the portable terminal 3 or the like. Then, when the inside-of-auxiliary area is concluded in the auxiliary area determination and the wireless signal is transmitted from the valid portable terminal 3, the process proceeds to step S150. In step S150, the vehicle control unit 23*d* unlocks the door and ends the process.

Further, if a negative determination is also concluded in step S140, it is determined that the valid portable terminal 3 is not present in any of the main area and the auxiliary area, the process proceeds to step S160. In step S160, an outside-of-area determination is concluded. Then the process ends. In this case, when the door is locked, the door is not unlocked. When the outside-of-area determination is concluded in step S160 after the door is unlocked, the door is locked.

As described above, in the vehicle system 100 according to the present embodiment, the determination area by the in-vehicle smart key unit 23 is set as a main area; the main area determination for determining whether the portable terminal 3 is present in the main area is performed. Further, an auxiliary area is formed by the tire-side apparatus 1; the tire-side apparatus 1 and the in-vehicle smart key unit 23 can also perform an auxiliary area determination for determining whether the portable terminal 3 is present in the auxiliary area.

For this reason, the determination area by the in-vehicle smart key unit 23 may cover not only the main area but also the auxiliary area. The main area may be reduced by a change in human body loss due to the manner in which the user holds the portable terminal 3. Even in such a case, auxiliary area is formed; thus, the determination area of the portable terminal 3 may be prevented from becoming narrowed. Therefore, the vehicle system 100 may be provided which includes the vehicle portable terminal position detection apparatus capable of suppressing the narrowing of the determination area to enable the presence of the portable terminal 3 to be accurately detected when the portable terminal 3 approaches the vehicle.

Further, the directivity characteristic of the antenna 15 provided in the tire-side apparatus 1 may be controlled to optimize the auxiliary area. This can be performed based on at least one of two angles that are (I) the angle of the tire-side apparatus 1 obtained from the detection signal by the acceleration sensor 12, and (ii) the steering angle of the steered wheel obtained from the detection signal by the steering angle sensor 25.

Figure 5:
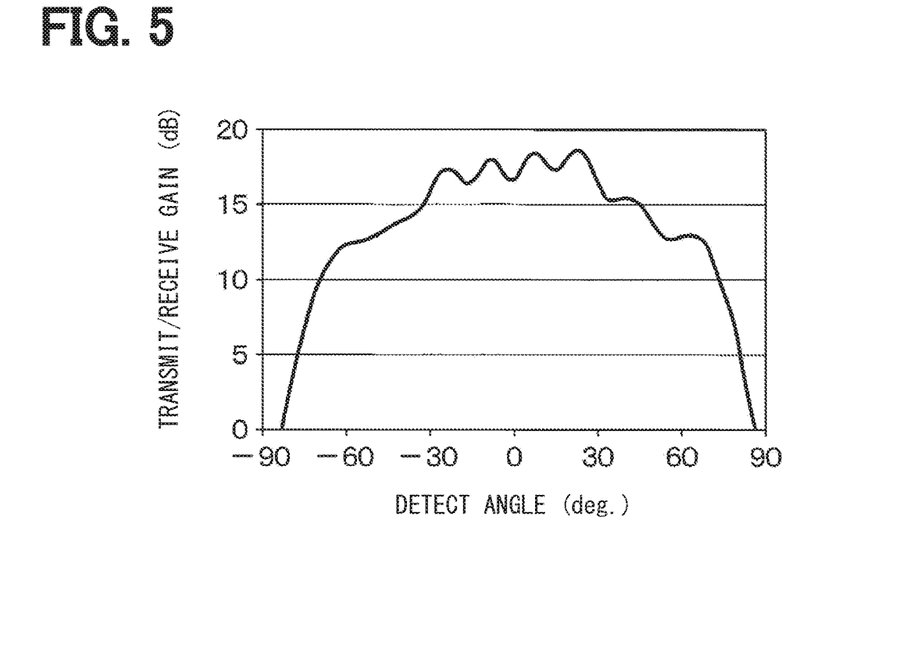
FIG. 5 is a diagram illustrating a transmission/reception gain with respect to a detection angle of an antenna.
Figure 6:
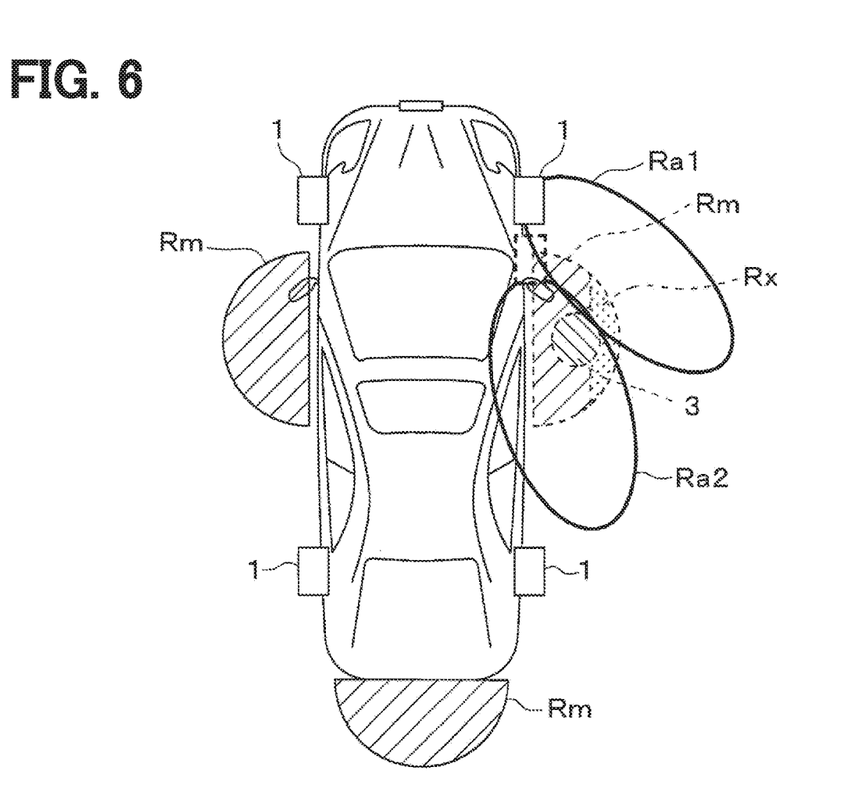
FIG. 6 is a diagram showing a difference in an auxiliary area when the angle of the tire-side apparatus is different.

For example, the transmission/reception gain with respect to the detection angle of the antenna has a relationship shown in FIG. 5. That is, in FIG. 5, a target that transmits a wireless signal in the same direction as that of the directivity (or orientation) of the antenna is defined as being located at 0 degree; the transmission/reception gain when the position of the target is changed around the antenna has the illustrated relationship. As shown in FIG. 6, when the target is located in the vicinity of the same direction as the direction of the directivity of the antenna, the transmission and reception gain is the largest. When the position of the target changes from that position, the transmission/reception gain gradually decreases. As described above, the transmission/reception gain changes based on the directivity of the antenna. When the directivity of the antenna is not changed, the auxiliary area may change as the angle of the tire-side apparatus 1 changes.

For example, as shown in FIG. 6, it has been confirmed that the angle varies between (i) the auxiliary area Ra1 when the angle of the tire-side apparatus 1 is 90 degrees and (ii) the auxiliary area Ra2 when the angle of the tire-side apparatus 1 is 180 degrees. In addition, about the tire-side apparatus 1 provided in the right front wheel, the solid line shows the position at 90 degrees, and the broken line shows the position at 180 degrees. Regardless of the angle, the range of the auxiliary area is different from that of the main area Rm and includes at least a part of the erroneous determination area Rx. Therefore, it is possible to suppress the determination area from becoming narrowed. Further, it is desired to cover the erroneous determination area Rx to allow the accurate area determination to be performed in the original main area Rm when there is no influence such as loss of the human body. For this reason, it is preferable to change the directivity of the antenna.

Therefore, the directivity control of the antenna 15 is performed based on at least one of the angle of the tire-side apparatus 1 and the steering angle. Thus, a wider range, preferably the entire range of the erroneous determination area Rx can be covered as the auxiliary area Ra. It is thus possible to optimize the auxiliary area Ra so that the erroneous determination area Rx can be further reduced. Further, the narrowing of the determination area can be suppressed so that the presence of the portable terminal 3 can be accurately detected when the portable terminal 3 approaches the vehicle.

If the antenna 15 is configured by, for example, an adaptive array antenna, directivity control can be performed. In addition, the angle of each tire-side apparatus 1 can be obtained based on a detection signal of the acceleration sensor 12 provided in the tire-side apparatus 1 itself. Therefore, the directivity characteristic may be changed based on the angle by the tire-side apparatus 1 itself. On the other hand, the steering angle is acquired by the data acquisition unit 23c in the in-vehicle smart key unit 23, the steering angle may be transmitted to the tire-side apparatus 1 through the data communication unit 23a.

Other Embodiments

Although the present disclosure has been described in accordance with the embodiment described above, the present disclosure is not limited to the embodiment described above, and encompasses various modifications and variations within the scope of equivalents. In addition, various combinations and forms, and further, other combinations and forms including only one element, or more or less than these elements are also within the scope and the spirit of the present disclosure.

For example, in the above-described embodiment, the vehicle system 100 in which the area of the portable terminal 3 is detected in the smart key system is described as an example of the portable terminal position detection apparatus for a vehicle. There is no need to be limited thereto. Any portable terminal position detection apparatus that detects the presence of a portable terminal within a predetermined determination area for a vehicle may be exemplified.

In the above-described embodiment, the area determination when opening and closing the driver's seat door is taken as an example. However, the same auxiliary area determination as in the above embodiment can be performed for the area determination when opening and closing the passenger seat door or the trunk room door. Of course, in a vehicle provided with doors other than the driver's seat door, the passenger's seat door, and the trunk room door, when an area determination is performed to open and close the other doors, the same auxiliary area determination as in the above embodiment may be performed.

Further, in the above embodiment, the auxiliary area is formed by the tire-side apparatus 1 of the front wheel on the driver's seat side for the area determination when the driver's seat door is opened and closed. This is also an example, and the auxiliary area may be formed for a different wheel, for example, the tire-side apparatus 1 corresponding to the rear wheel on the driver's seat side. Further, the auxiliary area may be formed for a plurality of wheels, for example, both the front wheel and the rear wheel on the driver's seat side.

An individual one of the controllers or ECUs described in the present disclosure as (i) the control unit 13 in the tire-side apparatus 1, (ii) the tire state detection unit 21b in the tire detection receiver 21, and (iii) the power meter unit 23b, the data acquisition unit 23c, and the vehicle control unit 23d in the in-vehicle smart key unit 23 may be implemented by one or more special-purpose computers. Such computers may be created (i) by configuring a memory and a processor programmed to execute one or more particular functions embodied in computer programs, or (ii) by configuring a processor provided by one or more special purpose hardware logic circuits, or (iii) by configuring a combination of (a) a memory and a processor programmed to execute one or more particular functions embodied in computer programs and (b) a processor provided by one or more hardware logic circuits. The computer programs may be stored, as instructions being executed by a computer, in a tangible non-transitory computer-readable storage medium.

For reference to further explain features of the present disclosure, the description is added as follows.

A door opening/closing system for a vehicle includes a smart key system that enables a vehicle door to be opened/closed using a portable terminal serving as an electronic key called a smart key (registered trademark) without using a mechanical key. The smart key system performs an area determination to detect the position of the smart key. When the user holding the smart key approaches the vehicle and the smart key becomes present in the predetermined area, an inside-of-area determination is concluded and the door is thereby unlocked. If the smart key is not present in the predetermined area, an outside-of-area determination is concluded and the door is thus not unlocked.

However, even when the portable terminal is located at the same position, the electric field strength when the radio wave is transmitted to the antenna in the smart key system may decrease by a change in the human body loss due to the way the user holds the portable terminal. As a result, the outside-of-area determination is concluded even though the portable terminal is in the predetermined area, and an erroneous conclusion occurs in the area determination. That is, the determination area of the portable terminal becomes narrowed.

It is thus desired to provide a portable terminal position detection apparatus for a vehicle; such an apparatus can prevent the determination area from being narrowed so that the presence of the portable terminal can be accurately detected when the portable terminal approaches the vehicle.

An aspect of the present disclosure described herein is set forth in the following clauses.

According to an aspect of the present disclosure, a portable terminal position detection apparatus for a vehicle is provided to detect a presence of a portable terminal in a predetermined area. The portable terminal position detection apparatus includes a reception apparatus, which may also be referred to as a vehicle body-side apparatus, provided on a body of the vehicle, and a tire-side apparatus attached to a wheel of a plurality of wheels in the vehicle. The reception apparatus is configured to communicate with the portable terminal, to receive a wireless signal transmitted by the portable terminal, to measure a first reception intensity in the received wireless signal, and to perform an area determination as to whether the portable terminal is present in a predetermined area. The tire-side apparatus is configured to communicate with the portable terminal and the reception apparatus, to receive a wireless signal transmitted by the portable terminal and to measure a second reception intensity in the received wireless signal. Here, the reception apparatus is configured to perform, as the area determination, a main area determination and an auxiliary area determination. The main area determination determines whether the portable terminal is present in a main area based on the first reception intensity measured by the reception apparatus. The auxiliary area determination determines whether the portable terminal is present in an auxiliary area based on the measured second reception intensity measured by the tire-side apparatus. Note that one or more computers or controllers may be included in the reception apparatus to implement the functions provided by the reception apparatus; one or more computers or controllers may be included in the tire-side apparatus to implement the functions provided by the tire-side apparatus.

As described above, the determination area of the reception apparatus is set as the main area; the main area determination is performed for determining whether the portable terminal is present in the main area. Further, an auxiliary area is formed in the tire-side apparatus, so that an auxiliary area determination can be performed for determining whether the portable terminal is present in the auxiliary area. For this reason, the determination area can be expanded to cover not only the main area but also the auxiliary area. The main area is supposed to be narrowed by the change in the human body loss due to how the user holds the portable terminal. Even in such a supposed case, forming of the auxiliary area can suppress the determination area of the portable terminal from being reduced. The portable terminal position detection apparatus can be thus provided which is capable of suppressing the narrowing of the determination area so that the presence of the portable terminal can be accurately detected when the portable terminal approaches the vehicle.

What is claimed is:

1. A portable terminal position detection apparatus for a vehicle to detect a presence of a portable terminal in a predetermined area, the portable terminal position detection apparatus comprising:
a reception apparatus provided on a body of the vehicle, the reception apparatus configured
to receive a wireless signal transmitted by the portable terminal,
to measure a first reception intensity in the received wireless signal, and
to perform an area determination as to whether the portable terminal is present in a predetermined area; and
a tire-side apparatus attached to a wheel of a plurality of wheels in the vehicle, the tire-side apparatus being configured
to receive a wireless signal transmitted by the portable terminal, and
to measure a second reception intensity in the received wireless signal,
wherein:
the reception apparatus is further configured to perform, as the area determination, a main area determination and an auxiliary area determination,
the main area determination determining whether the portable terminal is present in a main area based on the first reception intensity measured by the reception apparatus, and
the auxiliary area determination determining whether the portable terminal is present in a portion of an auxiliary area that overlaps a portion of the main area based on the second reception intensity measured by the tire-side apparatus, in response to the main area determination determining that the portable terminal is not present in the main area, and
the reception apparatus is further configured to determine that the portable terminal is present within the predetermined area in response to the main area determination determining that the portable terminal is present in the main area or the auxiliary area determination determining that the portable terminal is present in the portion of the auxiliary area that overlaps the portion of the main area.

2. The portable terminal position detection apparatus according to claim 1, wherein:
the tire-side apparatus is further configured
to perform a determination determining whether the portable terminal is present in the auxiliary area and to transmit data on a result of the determination to the reception apparatus; and the reception apparatus is further configured to perform the auxiliary area determination based on the data on the result of the determination transmitted from the tire-side apparatus.

3. The portable terminal position detection apparatus according to claim 1, wherein:
the tire-side apparatus is further configured to transmit data on a determination index to the reception apparatus,
the determination index being the measured second reception intensity in the wireless signal or an RSSI value corresponding to the measured second reception intensity in the wireless signal; and
the reception apparatus is further configured to perform the auxiliary area determination based on the data on the determination index transmitted from the tire-side apparatus.

4. The portable terminal position detection apparatus according to claim 1, wherein:
the tire-side apparatus includes an antenna configured to receive the wireless signal transmitted by the portable terminal; and
the tire-side apparatus is further configured to set the auxiliary area by performing a control of a directivity of the antenna.

5. The portable terminal position detection apparatus according to claim 4, wherein:
the tire-side apparatus is further configured to perform the control of the directivity of the antenna based on (i) an arranged angle, or (ii) a steering angle, or (iii) both the arranged angle and the steering angle,
the arranged angle being an angle at which the tire-side apparatus is located with respect to a center of a tire on the wheel to which the tire-side apparatus is attached,
the steering angle being an angle of a steered wheel of the vehicle.

6. A portable terminal position detection apparatus for a vehicle to detect a presence of a portable terminal in a predetermined area, the portable terminal position detection apparatus comprising:
a vehicle body-side apparatus provided on a body of the vehicle to communicate with the portable terminal, the vehicle body-side apparatus comprising one or more computers configured
to receive a wireless signal transmitted by the portable terminal,
to measure a first reception intensity in the received wireless signal, and
to perform an area determination as to whether the portable terminal is present in a predetermined area; and
a tire-side apparatus attached to a wheel of a plurality of wheels in the vehicle to communicate with the portable terminal and the vehicle body-side apparatus, the tire-side apparatus comprising one or more computers configured
to receive a wireless signal transmitted by the portable terminal, and
to measure a second reception intensity in the received wireless signal,
wherein:
the one or more computers in the vehicle body-side apparatus are further configured to perform, as the area determination, a main area determination and an auxiliary area determination, the main area determination determining whether the portable terminal is present in a main area based on the measured first reception intensity, and the auxiliary area determination determining whether the portable terminal is present in a portion of an auxiliary area that overlaps a portion of the main area based on the second reception intensity measured by the one or more computers in the tire-side apparatus, in response to determining that the portable terminal is not present in the main area, and the one or more computers are further configured to determine that the portable terminal is present within the predetermined area in response to the main area determination determining that the portable terminal is present in the main area or the auxiliary area determination determining that the portable terminal is present in the portion of the auxiliary area that overlaps the portion of the main area.

7. A portable terminal position detection apparatus for a vehicle to detect a presence of a portable terminal in a predetermined area, the portable terminal position detection apparatus comprising:

a reception apparatus provided on a body of the vehicle, the reception apparatus configured
 to receive a wireless signal transmitted by the portable terminal,
 to measure a first reception intensity in the received wireless signal, and
 to perform an area determination as to whether the portable terminal is present in a predetermined area; and a tire-side apparatus attached to a wheel of a plurality of wheels in the vehicle, the tire-side apparatus being configured
 to receive a wireless signal transmitted by the portable terminal, and
 to measure a second reception intensity in the received wireless signal, wherein:

the reception apparatus is further configured to perform, as the area determination, a main area determination and an auxiliary area determination,
 the main area determination determining whether the portable terminal is present in a main area based on the first reception intensity measured by the reception apparatus, and
 the auxiliary area determination determining whether the portable terminal is present in an auxiliary area based on the second reception intensity measured by the tire-side apparatus;

the tire-side apparatus includes an antenna configured to receive the wireless signal transmitted by the portable terminal; and the tire-side apparatus is further configured to set the auxiliary area by performing a control of a directivity of the antenna.

8. The portable terminal position detection apparatus according to claim 4, wherein:

the tire-side apparatus is further configured to perform the control of the directivity of the antenna based on (i) an arranged angle, or (ii) a steering angle, or (iii) both the arranged angle and the steering angle,
 the arranged angle being an angle at which the tire-side apparatus is located with respect to a center of a tire on the wheel to which the tire-side apparatus is attached, and
 the steering angle being an angle of a steered wheel of the vehicle.

* * * * *